(12) United States Patent
Westerfield

(10) Patent No.: US 12,372,172 B1
(45) Date of Patent: Jul. 29, 2025

(54) STAINLESS STEEL BIMETALLIC COUPLING

(71) Applicant: CALPIPE INDUSTRIES, LLC, Hobart, IL (US)

(72) Inventor: Robert Matthew Westerfield, Valparaiso, IN (US)

(73) Assignee: CALPIPE INDUSTRIES, LLC, Hobart, IL (US)

( * ) Notice: Subject to any disclaimer, the term of this patent is extended or adjusted under 35 U.S.C. 154(b) by 0 days.

(21) Appl. No.: 18/641,727

(22) Filed: Apr. 22, 2024

(51) Int. Cl.
| F16L 25/01 | (2006.01) |
| F16L 15/04 | (2006.01) |
| F16L 19/02 | (2006.01) |
| F16L 19/025 | (2006.01) |

(52) U.S. Cl.
CPC .............. *F16L 19/025* (2013.01); *F16L 15/04* (2013.01); *F16L 19/0206* (2013.01)

(58) Field of Classification Search
CPC ... F16L 19/025; F16L 19/0212; F16L 19/005; F16L 19/0231; F16L 19/0243; F16L 19/0206; F16L 19/0225; F16L 15/04; F16L 23/12; F16L 23/125; F16L 25/01; F16L 25/02; F16L 25/023
See application file for complete search history.

(56) References Cited

U.S. PATENT DOCUMENTS

| 2,794,658 A | * | 6/1957 | Purkhiser | F16L 47/005 |
| | | | | 285/123.1 |
| 2,867,463 A | * | 1/1959 | Snider | F16L 25/023 |
| | | | | 277/614 |
| 3,783,178 A | | 1/1974 | Philibert | |
| 6,734,360 B2 | | 5/2004 | Magno | |
| 9,350,154 B2 | | 5/2016 | Dinh | |
| 10,027,039 B1 | | 7/2018 | Smith | |
| 10,069,267 B2 | | 9/2018 | Dinh | |
| 11,105,449 B1 | | 8/2021 | Eaton | |
| 2005/0104372 A1 | | 5/2005 | Auray | |
| 2006/0138775 A1 | | 6/2006 | Auray | |
| 2008/0143103 A1 | | 6/2008 | Kiely | |
| 2013/0118802 A1 | | 5/2013 | Dinh | |
| 2014/0097023 A1 | | 4/2014 | Dinh | |
| 2015/0162718 A1 | | 6/2015 | Dinh | |

* cited by examiner

*Primary Examiner* — Aaron M Dunwoody
(74) *Attorney, Agent, or Firm* — KDW FIRM PLLC

(57) ABSTRACT

A conduit coupling assembly for joining together two metal conduits includes a first fitting having a first end opposite a second end, wherein the first end is threadably attached to the conduit, and a first washer attached to the second end of the first fitting, wherein the first washer is non-metallic. The coupling may further include a second fitting in abutment with the first washer, a nut surrounding the first fitting and the second fitting, and a second washer disposed between the nut and the second fitting, wherein the second washer is non-metallic.

19 Claims, 5 Drawing Sheets

STAINLESS STEEL BIMETALLIC COUPLING

FIELD OF THE DISCLOSURE

The present disclosure relates to couplings and, more particularly, to a stainless steel bimetallic coupling for joining together metal conduits.

DISCUSSION OF RELATED ART

Electrical conduits may be used for routing electrical wires in commercial and residential installations. Electrical conduit and couplings provide protection for enclosed conductors from environmental hazards, such as impact, moisture, electromagnetic interference, and/or or chemical vapors. Couplings and conduits, including intermediate conduit and electrical conduits, may be made of metal, such as conductive materials like galvanized steel tubing, or non-conductive materials, such as plastic, fiber, or clay.

When different metals are used in the couplings and conduits, the National Electrical Code (NEC) indicates to use a stainless-steel coupling as the transition fitting. However, this is not an adequate solution for a dissimilar metal connections, as galvanic reactions often occur. It is therefore a common practice to run additional materials to and from an enclosure to prevent joining dissimilar metals. However, this results in increased costs and inconsistent safety practices.

It is with respect to this and other drawbacks of the prior art that the present disclosure is provided.

SUMMARY OF THE DISCLOSURE

In one approach, a conduit assembly may include a conduit, and a coupling attached to the conduit, the coupling including a first fitting comprising a first end opposite a second end, wherein the first end is threadably attached to the conduit, and a first washer attached to the second end of the first fitting, wherein the first washer is non-metallic. The conduit assembly may further include a second fitting in abutment with the first washer, a nut surrounding the first fitting and the second fitting, and a second washer disposed between the nut and the second fitting, wherein the second washer is non-metallic.

In another approach, a coupling for connecting two conduits may include a first fitting comprising a first end opposite a second end, wherein the first end is threadably attachable to a first conduit of the two conduits, and a first washer attached to the second end of the first fitting, wherein the first washer is non-metallic. The coupling may further include a second fitting in abutment with the first washer, a nut surrounding the first fitting and the second fitting, and a second washer disposed between the nut and the second fitting, wherein the second washer is non-metallic.

In yet another approach, a method of attaching a first conduit with a second conduit may include attaching a first fitting and a first washer of a coupling to the first conduit, wherein the first washer is non-metallic, and wherein the first washer comprises an electrically conductive element. The method may further include inserting the second conduit through a second washer and a nut of the coupling, wherein the second washer is non-metallic, and attaching the second conduit to a second fitting. The method may further include securing the nut around the first fitting and the second fitting, wherein the second washer is disposed between the nut and the second fitting, and wherein the electrically conductive element is in direct physical and electrical contact with the first fitting and the second fitting.

BRIEF DESCRIPTION OF THE DRAWINGS

The accompanying drawings illustrate exemplary approaches of the disclosed armored cable assembly so far devised for the practical application of the principles thereof, and in which.

Figure 1:
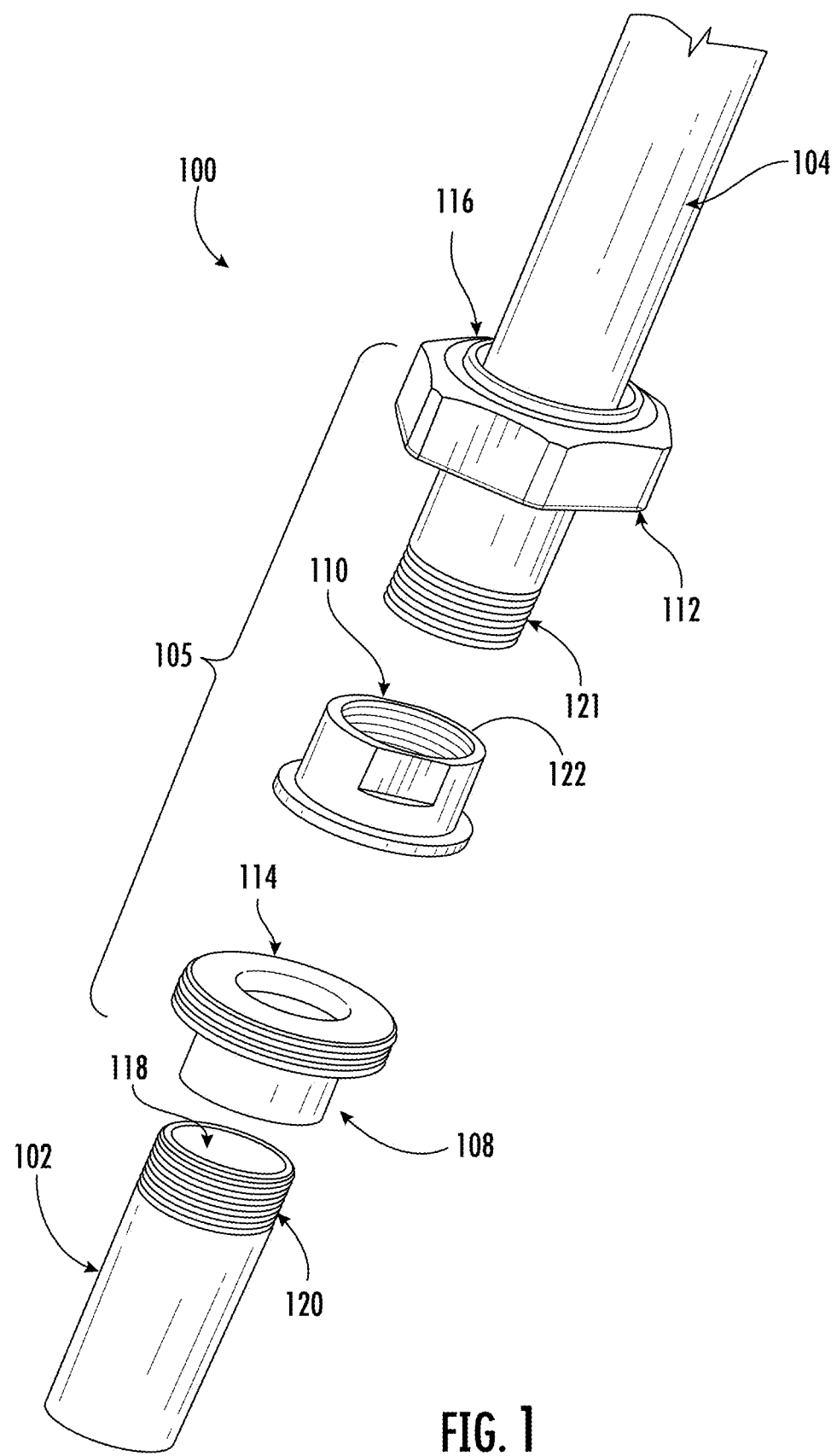
FIG. 1 is an exploded perspective view of a conduit coupling assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the re-usable snap-in fitting may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the above identified drawbacks of the prior art, embodiments of the present disclosure provide a bimetallic coupling manufactured with components that isolate dissimilar metals in an electrical conduit/fitting installation. This design ensures that a galvanic reaction does not exist in these applications when transitioning from stainless steel to a lesser noble metal, for example.

In some embodiments, a stainless steel (SS) conduit is threaded into a SS nut, which is equipped with a pre-installed, non-metallic (e.g., plastic) washer that is tightened to the SS conduit. An aluminum or galvanized electrical conduit is tightened to an aluminum or galvanized fitting on the other end. During assembly, the nut may be slid over the aluminum or galvanized conduit. A pre-installed internal copper wire may be provided within the non-metallic washer to allow for continuity/bonding to exist.

Referring now to FIG. 1, an exemplary conduit coupling assembly (hereinafter "assembly") according to embodiments of the present disclosure will be described in greater detail. As shown, the assembly 100 may include a first conduit 102 and a second conduit 104 joined together by a coupling 105. As will be described in greater detail herein, the coupling 105 includes a first fitting 108, a second fitting 110, and the nut 112. Secured to the first fitting 108 may be a first washer 114, and secured to a nut 112 may be a second washer 116.

Although non-limiting, the first conduit 102 and the second conduit 104 may each be electrical metallic tubing (EMT). EMT is a metal (e.g., steel, aluminum) raceway of circular cross section, which may be threaded or unthreaded. The first conduit 102 and the second conduit may be different metals. Although non-limiting, an outer surface of the first conduit 102 or the second conduit 104 may be galvanized for corrosion protection. For example, the outer surface may be treated with a combination of zinc, a conversion coating, and a clear organic polymer topcoat to form a triple layer of protection against corrosion and abrasion. In some embodiments, an interior 118 of the first conduit 102 or the second conduit 104 may include a low-friction coating, which allows wires to be pulled therethrough smoothly and easily, making installation easier and faster. Furthermore, EMT provides electromagnetic interference (EMI) shielding.

In this embodiment, the first conduit 102 includes external threading 120 and the second conduit 104 includes external threading 121. The external threading 120 of the first conduit 102 may be secured to corresponding threading (not shown) along an interior of the first fitting 108, while the exterior threading 121 of the second conduit 104 may be secured to corresponding threading 122 of the second fitting 110. In alternative embodiments, threading of the first conduit 102 and/or the second conduit 104 may be along an interior surface. The first conduit 102 and the second conduit 104 may have a same or different external diameter, and a same or different internal diameter. Embodiments herein are not limited in this context.

Figure 2:
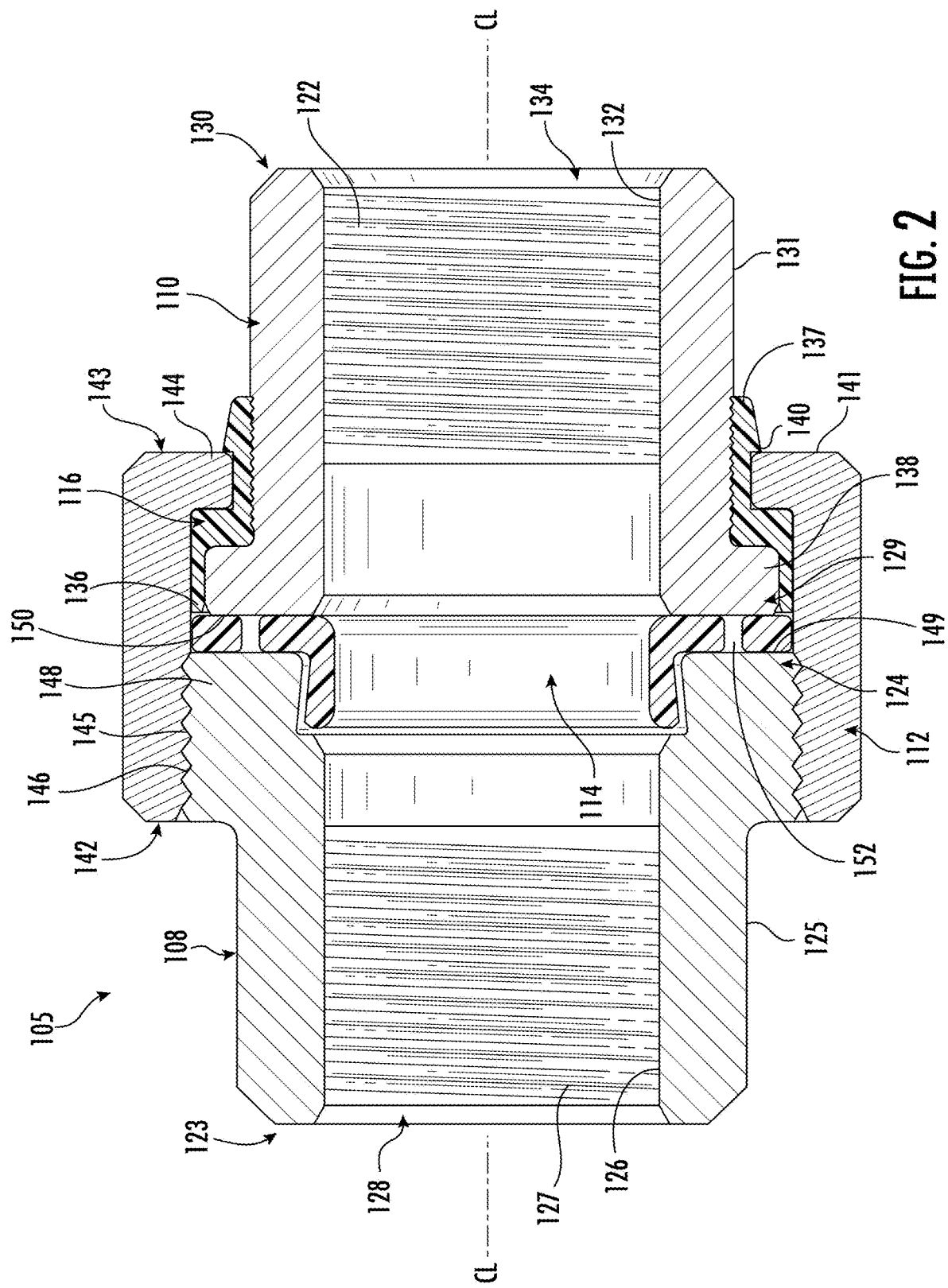
FIG. 2 is a side cross-sectional view of a coupling according to embodiments of the present disclosure.

FIG. 2 demonstrates the coupling 105 in greater detail. As shown, the first fitting 108 includes a first end 123 opposite a second end 124, an exterior surface 125, and an interior surface 126. Along the interior surface 126 may be threading 127 operable to secure the first fitting 108 to the first conduit 102. The first fitting 108 defines an interior passage 128.

The second fitting 110 includes a first end 129 opposite a second end 130, an exterior surface 131, and an interior surface 132. Along the interior surface 132 is threading 122 operable to secure the second fitting 110 to the second conduit 104. The second fitting 110 defines an interior passage 134, which is aligned with the interior passage 128 of the first fitting 108. Although shown as having a same inner diameter but different outer diameter, it'll be appreciated that the first and second fittings 108, 110 may have different inner and/or outer diameters in alternative embodiments.

The second washer 116, which is sandwiched between the second fitting 110 and the nut 112, may have a first end 136 and a second end 137, wherein the first end 136 surrounds a flange 138 of the second fitting 110. As shown, the first end 136 of the second washer 116 may therefore have a larger ID/OD than the second end 137 to accommodate the protrusion of the flange 138. In some embodiments, the second washer 116 may extend along the exterior surface 131 of the second fitting 110, beyond the nut 112. As further shown, the second end 137 of the second washer 116 may include a protrusion or notch 140 operable to engage an outer face 141 of the nut 112 to help retain the second washer 116 within the nut 112.

The nut 112 includes a first end 142 opposite a second end 143, wherein the first end 142 is threadably secured to the first fitting 108 and the second end 143 extends over the second washer 116 and over the second fitting 110. As shown, the nut 112 may include internal threading 145 operable to engage exterior threading 146 of the first fitting 108. In some embodiments, the second end 143 of the nut 112 may include a flange 144, which extends towards a centerline (CL) of the coupling 105.

Figure 3:
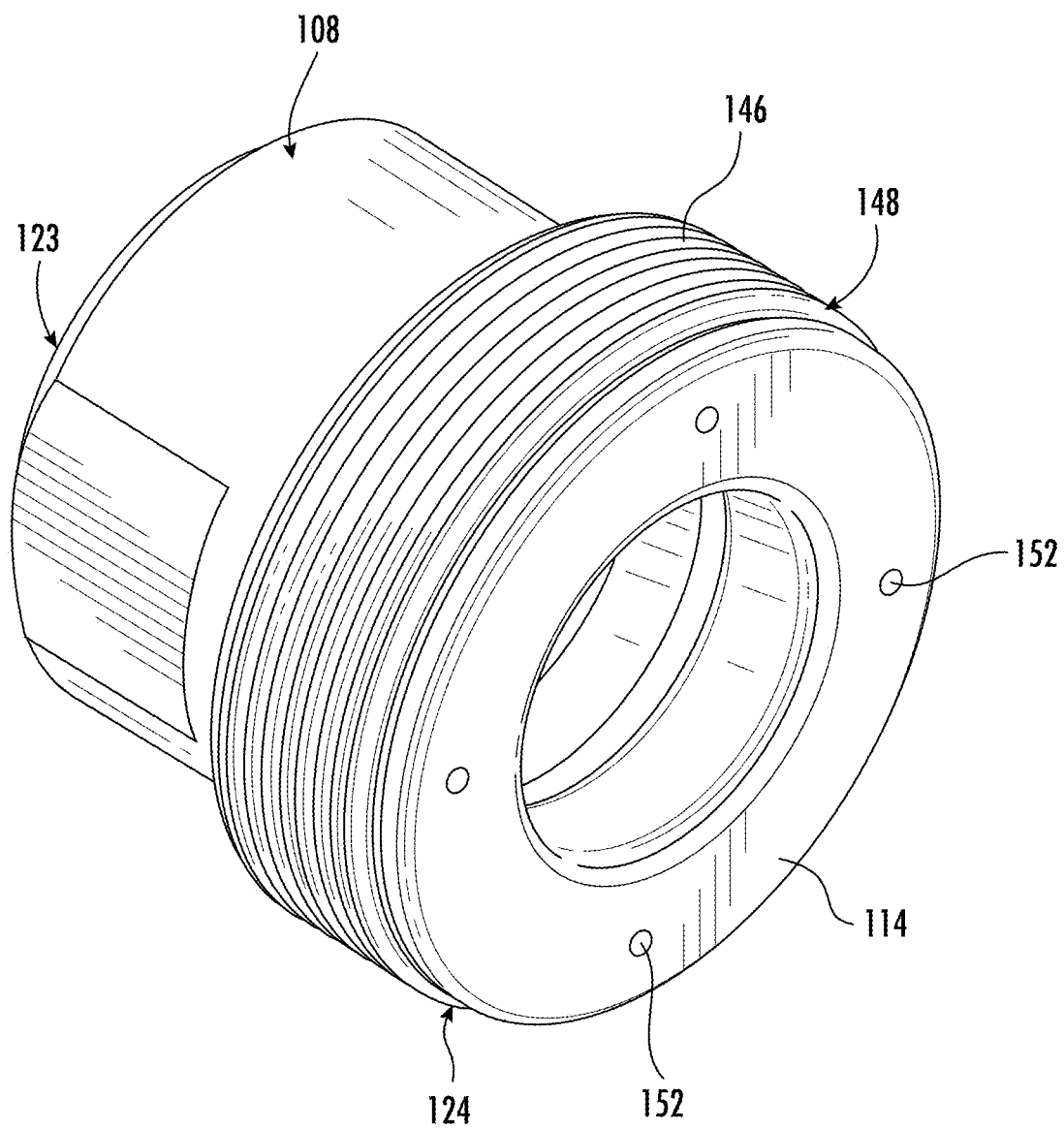
FIG. 3 is a perspective view of a portion of the coupling according to embodiments of the present disclosure.

Referring to FIGS. 2-3, the first washer 114 is positioned between the flange 138 of the second fitting 110 and a flange 148 of the first fitting 108. More specifically, the first washer 114 may be sandwiched between a first end face 149 of the first fitting 108 and a second end face 150 of the second fitting 110. As a result, an electrically conductive element 152 (e.g., bonding/grounding wire) within the first washer 114 is in direct physical and electrical contact with the first fitting 108 and the second fitting 110. In some embodiments, the electrically conductive element 152 may be one or more copper wires extending entirely through the first washer 114 to enable continuity/bonding to exist between the first and second fittings 108, 110. An interior diameter of the first washer 114 may be approximately equal to the interior diameters of the first fitting 108 and the second fitting 110. Embodiments herein are not limited in this context, however.

Figure 4:
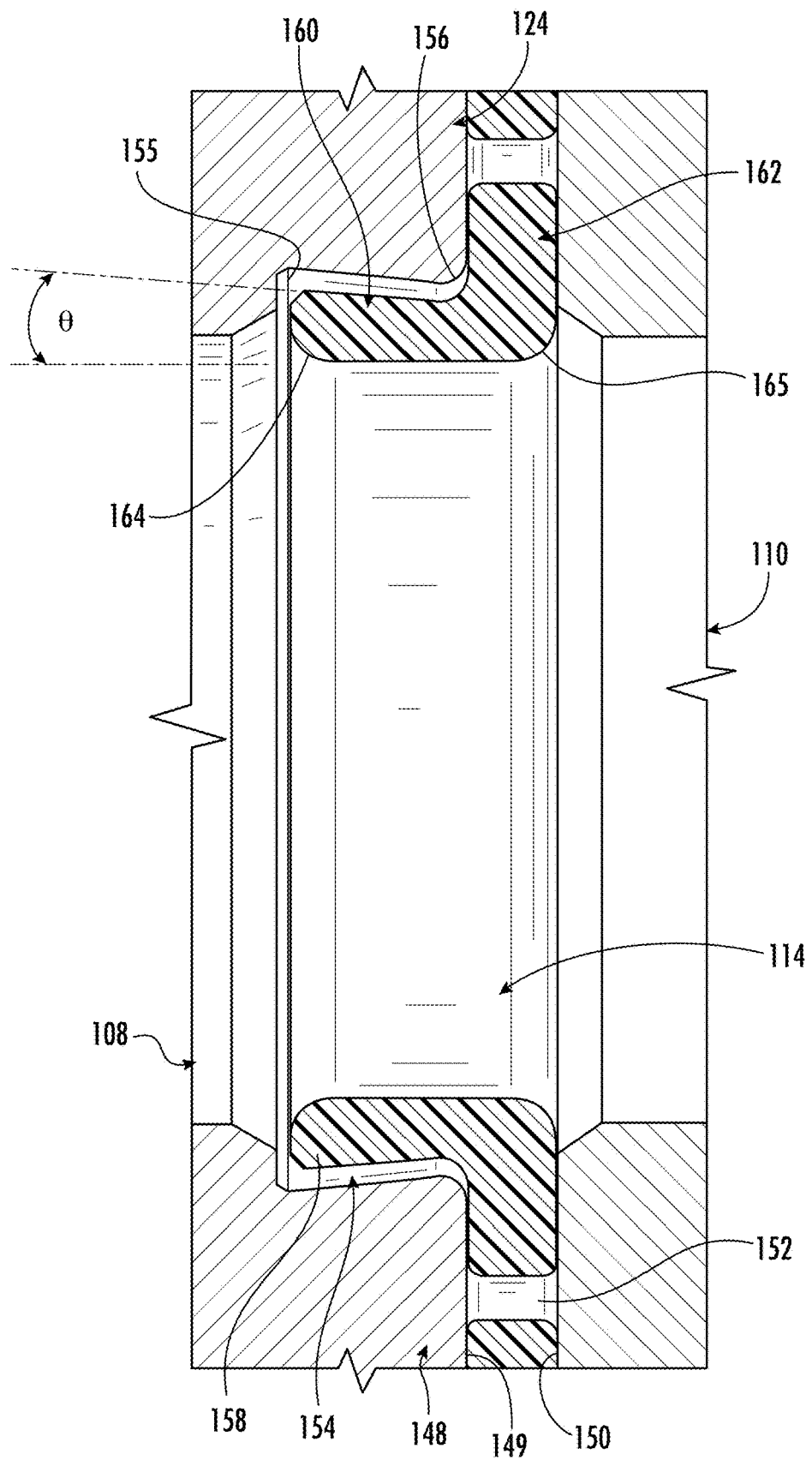
FIG. 4 is a side cross-sectional view of a portion of the coupling according to embodiments of the present disclosure.

FIG. 4 shows the connection between the first washer 114 and the first and second fittings 108, 110 in greater detail. In the embodiment shown, the first washer 114 may include a first section 160 connected with a second section 162, wherein the first section 160 is wedged or inserted into position within an opening 154 of the flange 148 of the first fitting 108. The second section 162 generally extends perpendicular from the first section, between the first end face 149 of the first fitting 108 and the second end face 150 of the second fitting 110. As shown, the opening 154 may define a corner 155, which is operable to engage a free end 158 of the first section 160 of the first washer 114. The corner 155 may have a greater inner diameter than an entrance 156 of the opening 154. In some embodiments, the free end 158 of the first washer 114 extends away from an interior of the coupling 105 at a non-zero angle, θ. The complimentary angles of the free end 158 of the first washer 114 and the inner surface of the opening 154 helps to retain the first washer 114 within the first end 124 of the first fitting 108. As further shown, one or more interior corners 164, 165 of the first washer 114 may be rounded or chamfered to minimize potential snags with wiring passing therethrough.

Figure 5:
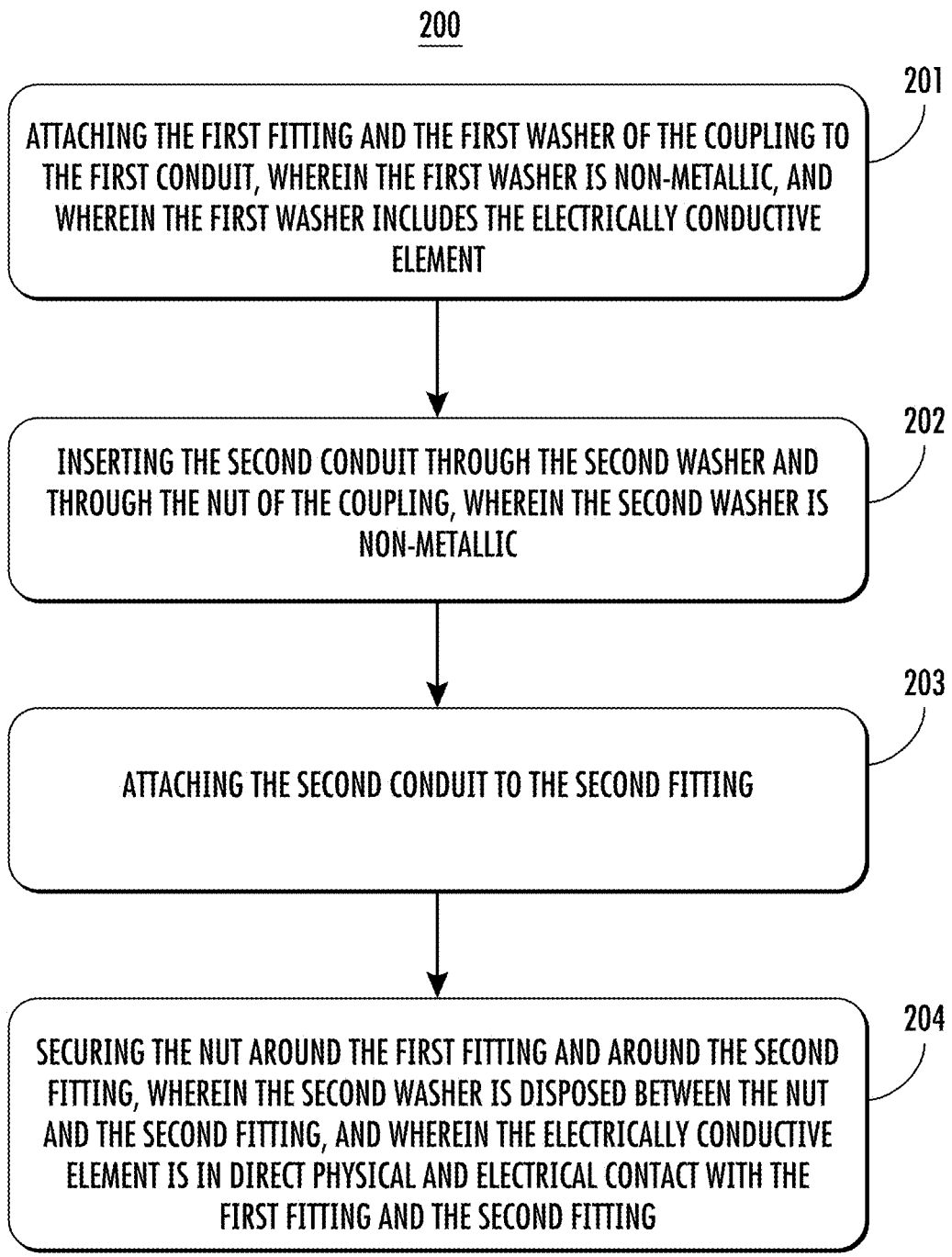
FIG. 5 is a flowchart of a method for assembling the conduit coupling assembly according to embodiments of the present disclosure.

FIG. 5 is a flowchart of a method 200 for assembling the assembly 100. At block 201, the method 200 may include attaching the first fitting 108 and the first washer 114 of the coupling 105 to the first conduit 102, wherein the first washer 114 is non-metallic (e.g., plastic), and wherein the first washer 114 includes the electrically conductive element 152. In some embodiments, the electrically conductive element 152 is a copper wire partially embedded within the first washer 114. In some embodiments, attaching the first fitting 108 to the first conduit 102 includes threadably securing the first conduit 102 within the interior of the first fitting 108.

At block 202, the method 200 may include inserting the second conduit 104 through the second washer 116 and through the nut 112 of the coupling 105, wherein the second washer 116 is non-metallic. In some embodiments, the first conduit 102 is made from a first metal (e.g., stainless steel), and the second conduit 104 is made from a second metal (e.g., aluminum). Furthermore, the coupling 105 may be made from stainless steel.

At block 203, the method 200 may include attaching the second conduit 104 to the second fitting 110. In some embodiments, attaching the second fitting 110 to the second conduit 104 includes threadably securing the second conduit 104 within the interior of the second fitting 110.

At block 204, the method 200 may include securing the nut 112 around the first fitting 108 and around the second fitting 110, wherein the second washer 116 is disposed between the nut 112 and the second fitting 110, and wherein the electrically conductive element 152 is in direct physical and electrical contact with the first fitting 108 and the second fitting 110. Separating the second conduit 104 from the nut 112 by the second washer 116 eliminates, or at least reduces, galvanic reactions between the dissimilar metals.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A conduit assembly, comprising:
   a conduit; and
   a coupling attached to the conduit, the coupling comprising:
   a first fitting comprising a first end opposite a second end, wherein the first end is threadably attached to the conduit;
   a first washer attached to the second end of the first fitting, wherein the first washer is non-metallic;
   an electrically conductive element within the first washer;
   a second fitting in abutment with the first washer;
   a nut surrounding the first fitting and the second fitting; and
   a second washer disposed between the nut and the second fitting, wherein the second washer is non-metallic.

2. The conduit assembly of claim 1, further comprising a second conduit attached to the coupling, wherein the first conduit is a first metal, and wherein the second conduit is a second metal, different than the first metal.

3. The conduit assembly of claim 2, wherein the second fitting comprises a first end opposite a second end, wherein the second conduit is threadably attached to the second end of the second fitting, and wherein the second washer surrounds the first end of the second fitting.

4. The conduit assembly of claim 1, wherein the electrically conductive element is in direct physical and electrical contact with the first fitting and the second fitting.

5. The conduit assembly of claim 1, wherein the first washer comprises a first end opposite a second end, and wherein the first end of the first washer extends away at a non-zero angle from a centerline of the coupling.

6. The conduit assembly of claim 5, wherein the second end of the first washer comprises a flange, and wherein the flange is wrapped around an end face of the second end of the first fitting.

7. The conduit assembly of claim 1, wherein a first interior diameter of the first fitting is the same as a second interior diameter of the second fitting.

8. The conduit assembly of claim 1, wherein a first exterior diameter of the first fitting is different than a second exterior diameter of the second fitting.

9. A coupling for connecting two conduits, the coupling comprising:
- a first fitting comprising a first end opposite a second end, wherein the first end is threadably attachable to a first conduit of the two conduits;
- a first washer attached to the second end of the first fitting, wherein the first washer is non-metallic;
- an electrically conductive element within the first washer:
- a second fitting in abutment with the first washer;
- a nut surrounding the first fitting and the second fitting; and
- a second washer disposed between the nut and the second fitting, wherein the second washer is non-metallic.

10. The coupling of claim 9, wherein the second fitting comprises a first end opposite a second end, wherein a second conduit of the two conduits is threadably attachable to the second end of the second fitting, and wherein the second washer surrounds the first end of the second fitting.

11. The coupling of claim 9, wherein the electrically conductive element is in direct physical and electrical contact with the first fitting and the second fitting.

12. The coupling of claim 9, wherein the first washer comprises a first end opposite a second end, and wherein the first end of the first washer extends away at a non-zero angle from a centerline of the conduit.

13. The coupling of claim 12, wherein the second end of the first washer comprises a flange, and wherein the flange is wrapped around an end face of the second end of the first fitting.

14. The coupling of claim 9, wherein a first interior diameter of the first fitting is the same as a second interior diameter of the second fitting.

15. The coupling of claim 9, wherein a first exterior diameter of the first fitting is different than a second exterior diameter of the second fitting.

16. A method of attaching a first conduit with a second conduit, the method comprising:
- attaching a first fitting and a first washer of a coupling to the first conduit, wherein the first washer is non-metallic, and wherein the first washer comprises an electrically conductive element;
- inserting the second conduit through a second washer and a nut of the coupling, wherein the second washer is non-metallic;
- attaching the second conduit to a second fitting; and
- securing the nut around the first fitting and the second fitting, wherein the second washer is disposed between the nut and the second fitting, and wherein the electrically conductive element is in direct physical and electrical contact with the first fitting and the second fitting.

17. The method of claim 16, wherein attaching the first fitting to the first conduit comprises threadably securing the first conduit within an interior of the first fitting, and wherein attaching the second fitting to the second conduit comprises threadably securing the second conduit within an interior of the second fitting.

18. The method of claim 16, wherein the first conduit is a first metal, and wherein the second conduit is a second metal, different than the first metal.

19. The method of claim 16, further comprising:
- angling a first end of the washer away from a centerline of the coupling away at a non-zero angle; and
- wrapping a second end of the first washer around an end face of a second end of the first fitting.

\* \* \* \* \*